(12) United States Patent
Parker et al.

(10) Patent No.: US 12,092,382 B2
(45) Date of Patent: Sep. 17, 2024

(54) POWER ELEMENT FOR REFRIGERANT MODULATING VALVE

(71) Applicant: Parker-Hannifin Corporation, Cleveland, OH (US)

(72) Inventors: Christian D. Parker, New Haven, MO (US); Max A. Witter, Washington, MO (US); Craig M. Obermark, Union, MO (US)

(73) Assignee: Parker-Hannifin Corporation, Cleveland, OH (US)

( * ) Notice: Subject to any disclaimer, the term of this patent is extended or adjusted under 35 U.S.C. 154(b) by 393 days.

(21) Appl. No.: 17/433,108

(22) PCT Filed: Mar. 26, 2020

(86) PCT No.: PCT/US2020/024959
§ 371 (c)(1),
(2) Date: Aug. 23, 2021

(87) PCT Pub. No.: WO2020/205430
PCT Pub. Date: Oct. 8, 2020

(65) Prior Publication Data
US 2022/0128278 A1    Apr. 28, 2022

Related U.S. Application Data

(60) Provisional application No. 62/928,702, filed on Oct. 31, 2019, provisional application No. 62/827,260, filed on Apr. 1, 2019.

(51) Int. Cl.
*F25B 49/00* (2006.01)
*F25B 41/35* (2021.01)
*F25B 49/02* (2006.01)

(52) U.S. Cl.
CPC ............ *F25B 49/005* (2013.01); *F25B 41/35* (2021.01); *F25B 49/02* (2013.01); *F25B 2500/06* (2013.01);
(Continued)

(58) Field of Classification Search
CPC ........ F25B 49/005; F25B 41/35; F25B 49/02; F25B 2600/2513; Y02B 30/70; F16K 31/04; F16K 37/0041
See application file for complete search history.

(56) References Cited

U.S. PATENT DOCUMENTS 4,523,436 A    6/1985    Schedel et al.
5,117,644 A *  6/1992    Fought ................... F25B 39/04
                                                    62/506
(Continued)

FOREIGN PATENT DOCUMENTS

CN    207501501    6/2018
EP    1530013      5/2005
(Continued)

OTHER PUBLICATIONS

International Search Report and Written Opinion for corresponding International Patent Application No. PCT/US2020/024959 mailed on Sep. 16, 2020.
(Continued)

*Primary Examiner* — Lionel Nouketcha
(74) *Attorney, Agent, or Firm* — Renner, Otto, Boisselle, Sklar, LLP

(57) ABSTRACT

An electronic modulating valve for a refrigerant system including a valve body; an electrically actuated valve member mounted in the valve body for modulating flow of fluid through the valve body; an electric power element having at least a portion of an electric actuator; and an electronic controller operably connected to the actuator, in which the
(Continued)

actuator is operably connected to the valve member to control movement of the valve member in response to commands from the controller. The valve may include a probe configured to sense a mechanical vibration in the system and/or a refrigerant leak sensor. The controller receives information from the probe and/or leak sensor and controls movement of the valve member via the actuator in response to the information. The controller may be configured with a closed-loop logic architecture to control movement of the valve member via the electric actuator.

16 Claims, 4 Drawing Sheets

(52) U.S. Cl.
 CPC ..... *F25B 2500/13* (2013.01); *F25B 2500/222* (2013.01); *F25B 2600/2513* (2013.01)

(56) References Cited

U.S. PATENT DOCUMENTS

| | | | |
|---|---|---|---|
| 5,616,829 A * | 4/1997 | Balaschak | G01M 3/184 251/20 |
| 6,145,753 A | 11/2000 | Yano et al. | |
| 6,612,503 B2 | 9/2003 | Hirota et al. | |
| 8,281,607 B2 | 10/2012 | Dolin | |
| 2011/0023513 A1 | 2/2011 | Hamel et al. | |

FOREIGN PATENT DOCUMENTS

| | | |
|---|---|---|
| JP | 2000346494 | 12/2000 |
| KR | 100379444 | 4/2003 |
| WO | 2007/099057 | 9/2007 |
| WO | 2019037510 | 2/2019 |

OTHER PUBLICATIONS

Parker-Hannifin Corparation; "Superheat Control Installation and Operation Instructions;" Sporlan; Bulletin 100-50-5.1; Aug. 2016; https://sporlanonline.com/literature/100/cp/100-50-5.1%20Superheat%20Control.pdf?elqTrackId=0d9a105c658f4c11a1f2669f0e955ca2&elqaid=10123&elqat=2.

"Universal Superheat Controller/Sensor (USHX)"; DMQ; http://www.dmq-us.com/product/universal-superheat-controller-sensor/; retrieved Aug. 16, 2018.

"Electronic Expansion Valve;" Sanhua Automotive; https://www.sanhuaautomotive.com/products/exv/; 2017.

* cited by examiner

POWER ELEMENT FOR REFRIGERANT MODULATING VALVE

RELATED APPLICATIONS

This application is a national phase of International Application No. PCT/US2020/024959 filed Mar. 26, 2020, which claims the benefit of U.S. Provisional Application No. 62/827,260 filed Apr. 1, 2019 and U.S. Provisional Application No. 62/928,702 filed Oct. 31, 2019, all of which are hereby incorporated herein by reference in their entireties.

TECHNICAL FIELD

The present application relates to refrigerant systems, and more particularly to refrigerant modulating valves, such as expansion valves, utilized in such refrigerant systems.

BACKGROUND

A typical refrigerant system includes at least one evaporator contained within the space that is to be cooled, a condenser that is located outside of the cooled space, a compressor positioned between the evaporator outlet and the condenser inlet, and an expansion valve. A refrigerant circulating through the system is compressed by the compressor which raises the temperature and pressure of the refrigerant. The then hot pressurized refrigerant gas flows through the condenser which serves as heat exchanger to allow the refrigerant to dissipate heat. The refrigerant condenses into a liquid and then flows through the expansion valve, where the liquid refrigerant moves from a high pressure zone into a low pressure zone, thus expanding and evaporating, and thereby becoming cold. The cold refrigerant passes into coils of the evaporator, thus absorbing heat from inside the space that is to be cooled. The evaporator could be located, for example, in the plenum of a forced air residential or commercial air conditioning system through which air is blown for cooling the interior of the residence or building. Other applications include automotive air conditioning systems and commercial food storage units.

A commonly used expansion valve for controlling flow of the compressed and liquified refrigerant from the condenser to the evaporator is a thermostatic expansion valve (TEV). Thermostatic expansion valves typically employ a fluid-filled capsule that senses the temperature of the refrigerant discharging from the evaporator. Expansion of the liquid from the capsule operates a pressure responsive moveable diaphragm in the valve that moves a valve member for controlling the liquid refrigerant flow through the valve. Such diaphragm actuated thermal expansion valves are often used in air conditioning systems for controlling refrigerant flow where rapid changes in operating conditions require a high degree of responsiveness by the valve.

Electronic expansion valves (EEVs) have been used to replace traditional TEVs in some applications. To convert a refrigerant system from a TEV to an EEV, numerous parts are typically needed; such as pressure transducer, temperature sensor, power supply, controller and sometimes a controller panel. One can see that the cost to convert from a TEV to an EEV can increase very quickly, not to mention the additional labor and needed room to mount the additional components on the system. Accordingly, there is a need in the market for a simpler design and/or lower cost replacement for TEVs.

SUMMARY

The electronic modulating valve described herein includes one or more advantageous features, such as a unique power element, one or more unique sensors, and/or a unique control logic for controlling operation of the valve. The valve described herein can be used, for example, as an air conditioning modulating valve, such as modulating expansion device. The valve may provide one or more advantages over conventional valves, such as providing a simpler design and/or lower cost replacement for conventional TEVs.

According to an aspect of the present disclosure, an electronic modulating valve for a refrigerant system includes: a valve body having an inlet passage and an outlet passage; an electrically actuated valve member mounted in the valve body, the valve member being movable within the valve body to modulate flow of fluid between the inlet passage and the outlet passage; an electric power element having at least a portion of an electric actuator; an electronic controller operably connected to the electric actuator, the electric actuator being operably connected to the valve member to control movement of the valve member in response to commands from the electronic controller; and a probe configured to sense a mechanical vibration in the refrigerant system; wherein the electronic controller is operably coupled to the probe and is configured to receive information from the probe that corresponds with the mechanical vibration, the electronic controller being configured to control movement of the valve member via the electric actuator in response to the information received from the probe.

According to another aspect of the present disclosure, a power element for a modulating valve of a refrigerant system, includes: at least a portion of an electric actuator configured for operating the modulating valve; an electronic controller operably connected to the electric actuator, the controller being configured to send commands to the electric actuator for controlling operation of the modulating valve; and a probe configured to sense a mechanical vibration in the refrigerant system; wherein the electronic controller is operably coupled to the probe and is configured to receive information from the probe that corresponds with the mechanical vibration, the electronic controller being configured to control operation of the modulating valve via the electric actuator in response to the information received from the probe.

According to another aspect of the present disclosure, an electronic modulating valve for a refrigerant system, includes: a valve body having an inlet passage and an outlet passage; an electrically actuated valve member mounted in the valve body, the valve member being movable within the valve body to modulate flow of fluid between the inlet passage and the outlet passage; an electric power element having at least a portion of an electric actuator; an electronic controller operably connected to the electric actuator, the electric actuator being operably connected to the valve member to control movement of the valve member in response to commands from the electronic controller; and a refrigerant leak sensor operably coupled to the controller, the refrigerant leak sensor being configured to detect a leak of refrigerant and communicate information associated with the leak to the electronic controller; wherein the electronic controller is configured to receive the information from the refrigerant leak sensor, and is configured to control movement of the valve member via the electric actuator in response to the information.

According to another aspect of the present disclosure, an electronic modulating valve for a refrigerant system, includes: a valve body having an inlet passage and an outlet passage; an electrically actuated valve member mounted in the valve body, the valve member being movable within the valve body to modulate flow of fluid between the inlet passage and the outlet passage; an electric power element having at least a portion of an electric actuator; an electronic controller operably connected to the electric actuator, the electric actuator being operably connected to the valve member to control movement of the valve member in response to commands from the electronic controller; wherein the electronic controller is configured with a closed-loop logic architecture to control movement of the valve member via the electric actuator.

According to another aspect of the present disclosure, a method of controlling a modulating valve with a closed-loop logic, includes: (i) determining whether step adjustment of an electric actuator is required, the step adjustment of the electric actuator corresponding with a step movement of a valve member of the modulating valve for modulating flow of fluid between an inlet passage and an outlet passage of the valve; (ii) advancing the electric actuator by one step to provide a corresponding step movement of the valve member further toward a closed position, or further away from the closed position; (iii) determining if a measured quantity derived from the step of the electric actuator was within an acceptable range; (iv) if the step in (iii) was not within the acceptable range, signal that the step advancement failed, and thereafter loop back to (i) to determine if further step adjustment is required; and (v) if the step in (iii) was within the acceptable range, signal that the step advancement succeeded, and thereafter loop back to (i) to determine if further step adjustment is required.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

The principles and aspects of the present disclosure have particular application to expansion valves utilized in refrigerant systems, such as for use in a vapor compression refrigerant cycle system typically found in, but not limited to, air conditioning, transport and refrigeration markets, and thus will be described below chiefly in this context. It is also understood that principles and aspects according to the present disclosure may be applicable to other fluid modulating valves for use in other portions of a refrigerant system, or in other fluid systems generally, such as a heat pump or refrigeration systems, where it is desirable to provide one or more of the advantageous features provided by the exemplary fluid modulating valve described herein.

As used herein, the term "fluid" means a substance having no fixed shape, including liquids, vapors, and/or gases. As used herein, "refrigerant" means a working fluid used as the heat carrier for a refrigerant system. The refrigerant may include any material suitable for such use. These materials include, ammonia and various CFCs or HCFCs, and include replacements for the environmentally undesirable CFCs and HCFCs, including, e.g., R12, R22 and R410a, and also A2L refrigerants such as R-32, for example. Other possible refrigerants include A1, A3 or B classification refrigerants. Such refrigerants may be non-flammable, mildly flammable, or flammable.

Figure 1:
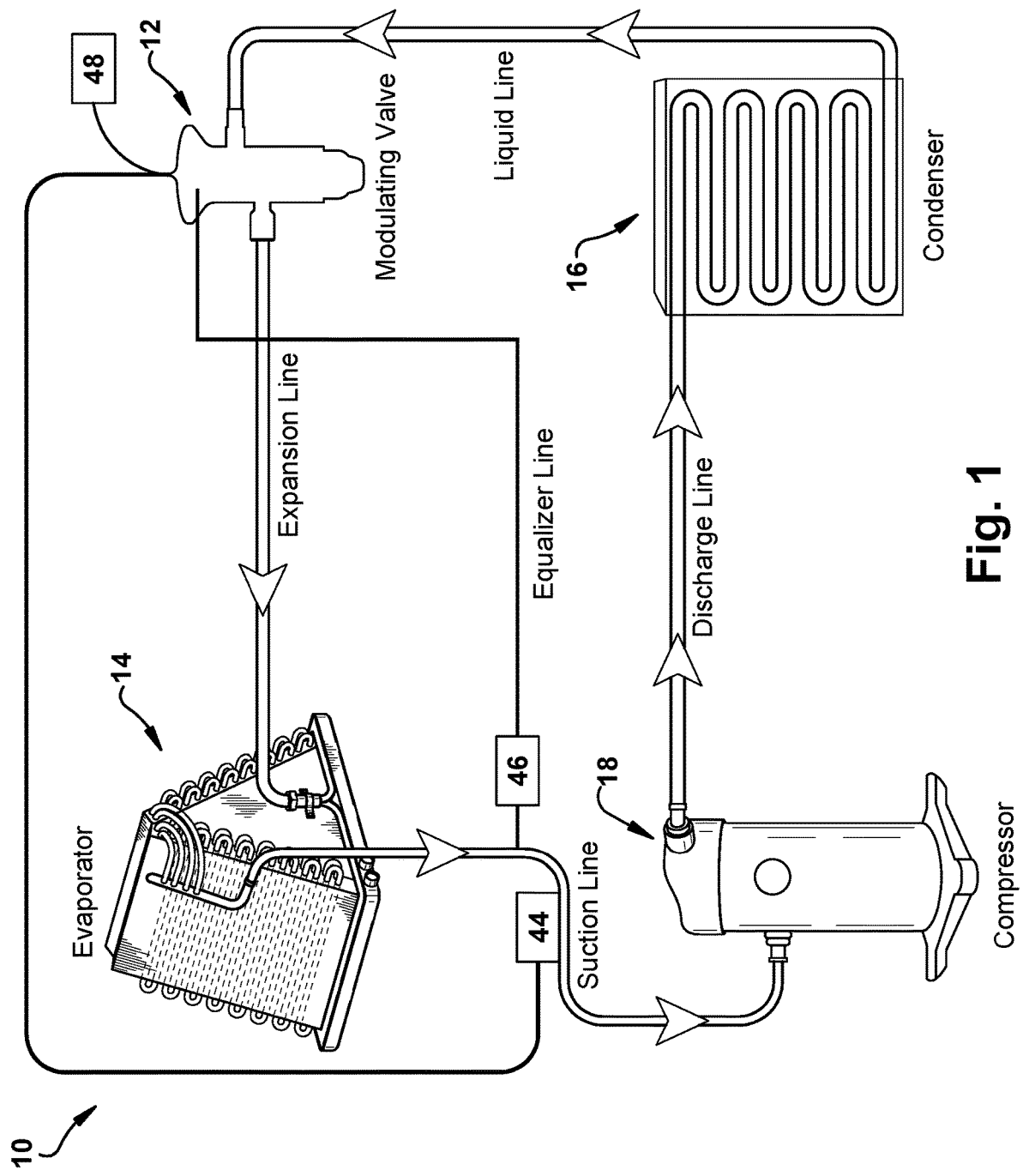
FIG. 1 is a schematic view of an exemplary refrigerant system including an exemplary refrigerant modulating valve according to an embodiment of the invention.

Referring to FIG. 1, an exemplary refrigerant system 10 having an exemplary electronic modulating valve 12 is shown. The refrigerant system 10 includes an evaporator 14 contained within a space that is to be cooled, a condenser 16 that is located outside of the cooled space, a compressor 18 positioned between the evaporator outlet and the condenser inlet, and the modulating valve 12. A refrigerant circulating through the system is compressed by the compressor 18 which raises the temperature and pressure of the refrigerant. The then hot pressurized refrigerant gas flows through the condenser 16 which serves as heat exchanger to allow the refrigerant to dissipate heat. The condenser 16 lowers the refrigerant temperature such that the refrigerant condenses into a liquid. The refrigerant then flows through the refrigerant modulating valve 12, which is configured to control flow of the compressed and liquified refrigerant from the condenser 16 to the evaporator 14. In the illustrated embodiment, the electronic modulating valve 12 is configured as an expansion valve, where the liquid refrigerant moves from a high pressure zone into a low pressure zone, thus expanding and evaporating the refrigerant, and thereby becoming cold. The cold refrigerant passes downstream of the valve 12 into circuits of the evaporator 14, thus absorbing heat from inside the space that is to be cooled. The evaporator 14 could be located, for example, in the plenum of a forced air residential or commercial air conditioning system through which air is blown for cooling the interior of the residence or building. Other applications include automotive air conditioning systems and commercial food storage units.

Figure 2:
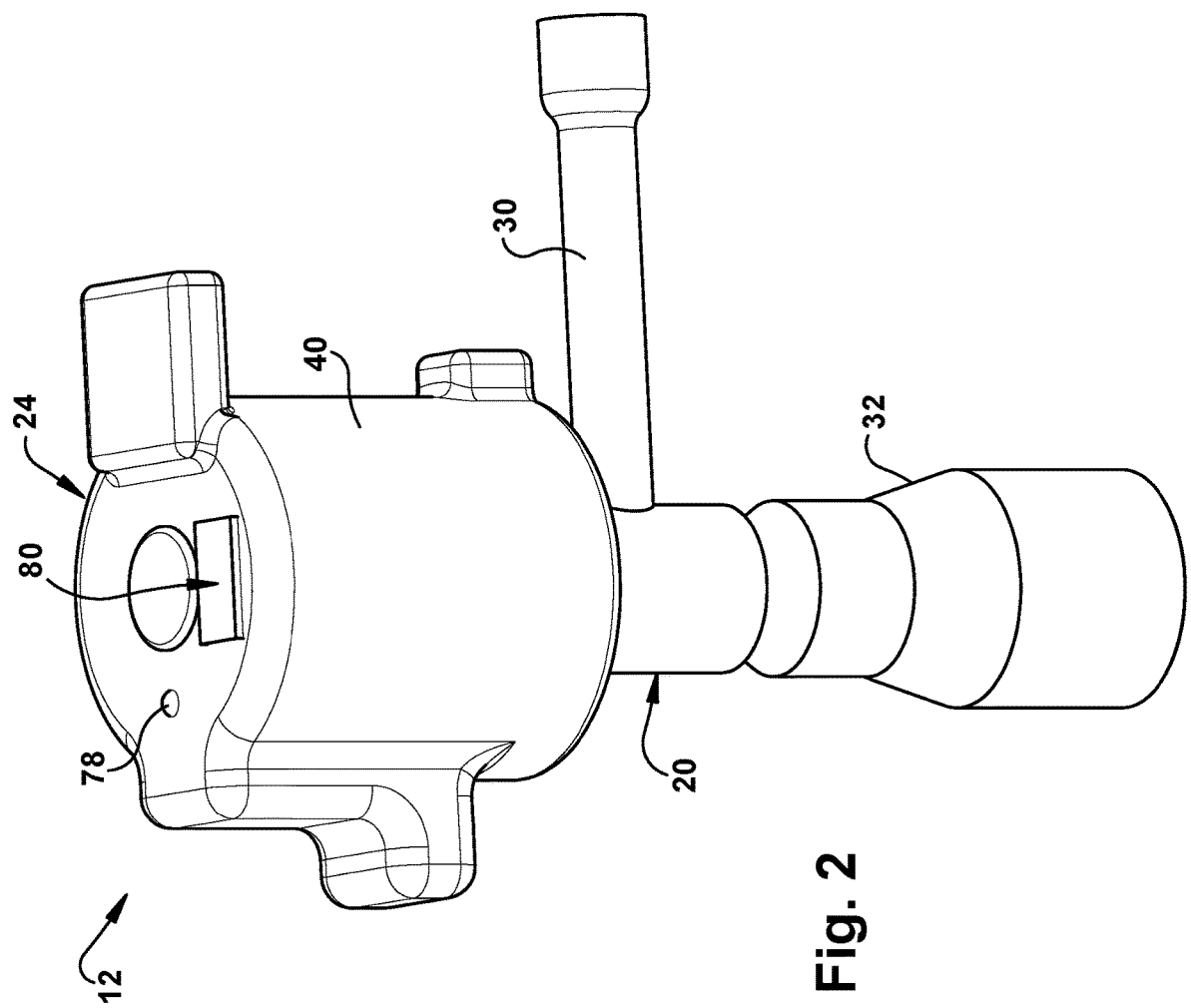
FIG. 2 is a perspective top, front view of the exemplary refrigerant modulating valve according to an embodiment of the invention.
Figure 3:
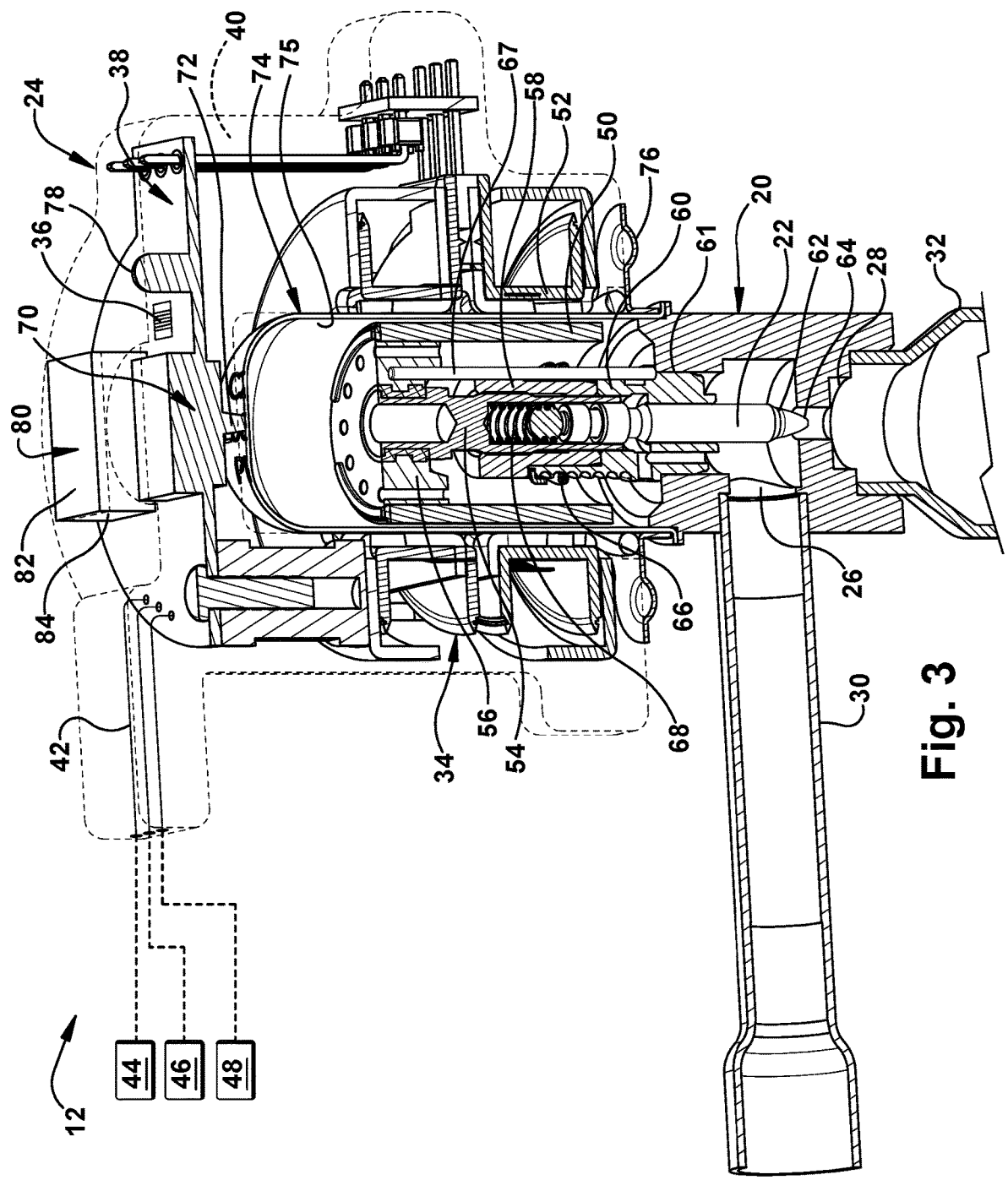
FIG. 3 is a perspective top, rear cross-sectional view of the refrigerant modulating valve, with an exemplary housing of an exemplary power element shown in transparent view.

Referring to FIGS. 2 and 3, the exemplary electronic modulating valve 12 is shown in further detail. As discussed above, the modulating valve 12 may be configured as expansion valve for use in the refrigerant system 10, and thus will be described below primarily in this context. It is understood, however, that the modulating valve 12 may be utilized in other parts of the system 10 for controlling flow of refrigerant fluid as may be desired for a particular application.

As shown, the electronic modulating valve 12 (also referred to as the modulating valve 12 or valve 12) includes a valve body 20, an electrically actuated valve member 22 mounted in the valve body 20, and an electric power element 24. The valve body 20 includes an inlet passage 26 and an outlet passage 28. The inlet passage 26 is connectable to an inlet fluid conduit 30 (e.g., rigid tube or pipe) for carrying the condensed liquid from the condenser 16 into the valve body 20. The valve member 22 is movable within the valve body to modulate flow of refrigerant between the inlet passage 26 and the outlet passage 28, thus expanding and evaporating the refrigerant. The outlet passage 28 is connectable to an outlet fluid conduit 32 (e.g., rigid tube or pipe) for carrying the expanded refrigerant downstream to the evaporator 14.

The power element 24 includes at least a portion of an electric actuator 34 and an electronic controller 36 operably connected to the electric actuator 34. Generally, the electric actuator 34 is operably connected to the valve member 22 to control movement of the valve member 22 in response to commands received from the electronic controller 36. As described in further detail below, the unique power element 24 may include one or more unique sensors and/or a unique control logic for controlling operation of the valve 12. Generally, the electronic controller 36 is operably coupled to the one or more sensors and/or is programmed with the control logic, and is configured to control movement of the valve member 22 via the electric actuator 34 in response to information received from the sensor(s) and/or logic.

The controller 36 may include any suitable device for processing data, including by way of non-limiting example a programmable processor or multiple processors. The controller 36 may include, in addition to hardware, code that creates an execution environment for the control logic. In exemplary embodiments, the controller 36 is included in an electrical circuit, such as a printed circuit board, collectively referred to as electronics 38. The electronics 38 are mounted within a housing 40 of the power element 24. The housing 40 may seal an inside of the housing from the external environment to prevent moisture or other environmental effects from damaging the electronics. Alternatively, the controller 36 may be located remotely from the valve 12 and operably connected to the electric actuator 34 and other components via a suitable connection, such as a wired or wireless connection.

The electronics 38 of the valve (e.g., controller 36 and/or other suitably connected circuits) typically will include associated input and output circuits for interfacing with the sensors and the modulating valve 12 for controlling the valve 12 in response to signals received from the sensors. That is, the controller 36 will interpret the sensed data and output control signals to the actuator 34, be it a solenoid, rotary motor, thermal actuator, etc. The controller 36 may also provide for fault detection and/or diagnostics. For example, the controller 36 may be programmed based on sensor inputs to predict a failure before it happens, thereby reducing expense and/or downtime. The controller 36 also may be able to take mitigating action.

The electronics 38 may also be provided with one or more communications interfaces for providing system and performance information locally to a tool or device (e.g., smartphone) or remotely to a network or the internet. To this end, the electronics 38 may be provided with a connector or leads 42 for enabling communication to one or more external devices, including additional sensors, such as one or more external temperature and/or pressure sensors 44, 46 (shown also in FIG. 1). Alternatively or additionally, such communication can be effected wirelessly using conventional wireless communication means, such as a wireless LAN, Bluetooth, or NFC. Such communication also enables the valve 12 to be linked to the overall system control, such as a controller in a residential air conditioning or heat pump system, for providing total comfort control through the linking of all HVAC components together through smart components, such as the valve 12, thermostat and condensing unit. Also enabled is the ability to alert a homeowner, maintenance personnel or a contractor of problems, such as by transmitting an alert signal and/or other information, e.g. status information, to an external display conveniently located for access by a technician or a homeowner. In one particular embodiment, the communication component of the electronics 38 can be internet enabled for communicating, for example, with a remotely located monitoring station. In addition, the modulating valve 12 may have preset parameters that can be reset in the field if desired, such as if the system is changed over to a different refrigerant or another system component is replaced in the field.

The controller 36 may also be configured to control the flow of refrigerant to the evaporator 14 under a wide range of load conditions. In addition, the controller 36 may "learn" what refrigerant it is being used by comparing relationships of information received by the sensors (e.g., pressure, temperature) in the system to those corresponding to a given refrigerant. The controller 36 can then adjust (self-configure) the operating parameters to the sensed refrigerant type for optimal control of the valve 12. As a result of these features, a single modulating valve 12 can be provided to accommodate a number of different variables such as system size, load requirements, different refrigerants, etc.

Although the electronics 38, including the controller 36, may be powered by an onboard battery for some applications, usually the electronics 38 will receive power via the leads 42 connected to a remote power source 48 (also shown schematically in FIG. 1). For example, a 24 volt power may be supplied from a transformer typically provided to supply power to other components of a heating and ventilation system, such as the overall system controller. In exemplary embodiments, the modulating valve 12, sensors and electronics 38 may all be included in a single monolithic unitary package that greatly facilitates quick and easy installation. In a typical configuration, only power wires have to be connected in addition to the connection of the package to the flow lines 30 and 32. A further connection may be needed if wired communication is provided.

The electric actuator 34 may be any suitable device for actuating the valve member 22, such as a valve pin, to thereby control fluid flow through the valve 12. In the illustrated embodiment, the electric actuator 34 is an electric motor 34 having a rotor 50 with magnets and a stator 52 with electrical windings. The electric motor 34 may operate on alternating current and is connected to a suitable power source (e.g., power source 48). As shown, the rotor 50 is located radially inwardly of the stator 52 and windings, and is operably connected to the valve member 22 via suitable connectors, such as via a threaded shaft 54 and a cap 56. The connectors 54, 56 rotate with the rotor 50, thereby rotating the valve member 22. A fixed nut 58 is press fit with a sleeve 60 that is fixed to the valve body 20, such as at location 61. The rotating motion of the valve member 22 and the nut 58 is translated to linear axial motion via the threaded engagement between the nut 58 and the shaft 54. The shaft 54 drives the valve member 22 axially. This linear axial movement moves a metering surface 62 of the valve member 22 toward or away from a metering orifice 64 in the valve body 20 to thereby modulate refrigerant flow, such as to cause expansion of the refrigerant, or to close the flow path entirely. A biasing member 66, such as a spring, may be provided to engage the fixed sleeve 60 and stop pin 67 and serves as a stop mechanism for the actuator 34. An internal biasing member 68, such as a spring, may be utilized to set the amount of seating force applied when closed.

Probe

One drawback with some conventional expansion valve designs is that they are limited to sensing only temperature and pressure in the refrigerant system.

One aspect of the present disclosure provides a sensor in the form of a probe 70 that is in operable communication with the refrigerant system 10 for sensing a mechanical characteristic in the system 10. The electronic controller 36 is operably coupled to the probe 70 (such as via electronics 38) and is configured to receive information from the probe 70 that corresponds with the mechanical characteristic. The controller 36 is configured to control movement of the valve member 22 via the electric actuator 34 based upon the information received from the probe 70.

In exemplary embodiments, the mechanical characteristic sensed by the probe 70 is a mechanical vibration in the system 10. The mechanical vibration may come from one or more components of the system, including the modulating valve 12, condenser 16, evaporator 14, compressor 18; or any other suitable component used in the system, such as one or more fans, or the like. Each of these components may generate a mechanical vibration having a unique vibrational signature during its operation. Such a vibrational signature may include, for example, a vibrational signal having one or more of a unique shape, amplitude, frequency, waveform and/or phase characteristic(s) of the mechanical vibration that may be detected by the probe 70 and deciphered by the controller 36. The vibrational signature from the component(s) may include, among other things, a series of detectable geometries, a continuous repeating pattern of the mechanical vibration, a discrete vibrational signal waveform, periodic and/or aperiodic vibration waveforms, or any other suitable characteristic of a vibrational signal that may be detected by the probe 70 and processed by the controller 36 via suitable signal processing techniques (e.g., geometry recognition, Fourier analysis; filtering such as high pass, low pass, band pass, and notch filtering; phase response; sampling; aliasing; or any other suitable technique).

The probe 70 preferably is able to sense, and the controller 36 preferably is able to decipher, multiple such vibrational signatures from multiple components of the system 10 operating simultaneously. The vibrational signatures that are detected and processed may indicate a healthy conditional operation of the component(s) and/or may indicate a defective conditional operation of the component(s). Alternatively or additionally, the vibrational signatures that are detected and processed may indicate whether the component(s) are currently operating or not operating. The controller 36 may use the information corresponding to the mechanical vibration, along with other system sensor inputs, such as current, pressure, temperature or virtual sensors like superheat and subcooling, to determine if the component(s) need to be repaired or replaced, for example.

In the illustrated embodiment, the mechanical vibration sensed by the probe 70 includes vibration that is transmitted through the medium of rigid mechanical connections in the system 10. For example, the modulating valve 12 may be rigidly connected to the system via conduits 30, 32 (e.g., metal tubes) that connect, directly or indirectly, to other components of the system (e.g., evaporator 14 and condenser 16), which may themselves operably connect the valve 12 to still other components (e.g., compressor 18) via rigid mechanical connections. The vibrations generated from each component may be transferred to the probe 70 via such rigid connections (e.g., conduits, brackets, bodies, etc.). In exemplary embodiments, the probe 70 is mounted to, or in contact with, a portion of the valve 12 that is in vibrational communication with the system 10 via such rigid mechanical connection(s).

For example, in the illustrated embodiment, the probe 70 is contained within the housing 40 of the power element 24 and includes a probe tip 72 that directly contacts other portions of the valve 12, such as an amplifier 74 which is described in further detail below. In this manner, the probe 70 may sense the upstream (e.g., condenser 16) and downstream (e.g., evaporator 14 and compressor 18) mechanical vibrations via the inlet and outlet tubing 30, 32 that is rigidly connected to the valve body 20. The inlet and outlet tubing 30, 32 are in communication with the condenser 16 and evaporator 14 and compressor 18. By sensing the mechanical vibration characteristics of each component, the controller 36 may determine the compressor operating mode (running or not running) for advanced control without additional wiring. The controller 36 may also use information corresponding with the mechanical vibration on the inlet fitting to detect a clogged inlet filter drier, for example. By utilizing the vibrational signatures, the controller 36 may determine the reversing valve operating mode (switching or not switching) for advanced control without additional wiring. By utilizing vibrational communication from the valve 12, and more directly, the flow inside of the valve 12 and the expanding gas at the outlet 28 of the valve port, the controller 36 may determine the condition of the refrigerant state (liquid, partial liquid, vapor) and direction of flow for advanced control. The power element 24 with these features may use the mechanical vibrational communications described above for advanced system starting routines to aid in efficiency standards for residential air conditioning and heat pump systems.

The power element 24 may also use the downstream (e.g., evaporator 14) vibrational communication via the valve outlet fitting to determine the indoor fan operating mode (e.g., on, off, starting, stopping or the like). This may be done by utilizing the vibrational communication between the outlet fitting of the valve and the evaporator 14, and a vibrational communication between the rigid mounting of the evaporator 14 to a metal box, and the rigid mounting between the indoor fan to the metal box. The same vibrational communication path may be used to detect a clogged air filter.

The power element 24 also may detect the linear (up and down) movement of the valve member 22 and/or rotor 50 inside of the valve. Alternatively or additionally, the power element 24 may have a sensor configured to detect the magnet field of the rotor 50 as it moves up (valve open) and when it moves down (valve closed). The power element 24 may use the rotor magnetic field along with the mechanical vibrational communications sensed by the probe 70 to determine valve position and/or no movement (stalling).

In exemplary embodiments, the modulating valve 12 may include a mounting bracket 76 for facilitating mounting of the power element 24 to the valve body 20. As shown, the mounting bracket 76 is in direct contact with the valve body 20 and/or other portions of the valve 12, and may transfer vibrational energy to the probe 70 for sensing the mechanical vibration in the system 10. In exemplary embodiments, the controller 36 may be configured to detect when the power element 24 is separated from the modulating valve 12. By utilizing the mechanical contact points of the probe 70 in the valve, and the mechanical bracket 76, the controller 36 may be able to determine when the power element 24 is removed from or installed onto the modulating valve 12.

Alternatively or additionally, the probe 70 may sense vibration that includes sound, which may be transferred via a medium such as the air around the components, the working fluid (e.g., refrigerant), and/or the rigid mechanical connections. Generally, the vibrations in air are traveling longitudinal waves, which the probe 70 may be able to sense and communicate to the controller 36.

The probe 70 may include any suitable device for sensing the mechanical vibration in the system and transmitting information corresponding to this mechanical vibration to the controller 36. For example, the probe 70 may include an electromechanical transducer that is configured to convert the mechanical vibrations (e.g., vibrational signatures) to an electric signal for processing thereof by the controller 36. The electromechanical transducer may be any suitable device, such as an accelerometer or other suitable piezoelectric device, or a microphone, for example.

In exemplary embodiments, the power element includes the amplifier 74 which is configured to amplify the mechanical vibrations from the valve 12 and/or other component(s) of the system 10 prior to such vibrations being received by the probe 70. In the illustrated embodiment, the amplifier 74 includes a body 75 that forms a resonant chamber (also referred to with reference numeral 75). The body forming the resonant chamber 75 is operably coupled to the valve body 20. As shown, the rotor 50 of the electric motor 34 may be contained within a portion of the resonant chamber 75, with the stator 52 and windings being disposed radially outwardly of the chamber 75. Also as shown, portions of the valve member 22 and/or connectors to the actuator may be contained within a portion of the resonant chamber 75. In the illustrated embodiment, the tip portion 72 of the probe 70 is in direct contact with the body of the resonant chamber 75, such as at a top outer surface. The tip portion 72 may be a rigid tip (such as a rigid conduit), or may be flexible. The resonant chamber 75 may act as a "drum" to amplify system 10 and valve 12 specific mechanical vibrations. The mechanical bracket 76 also may aid in the mechanical vibrational communication between the valve body 20 and the power element 24. The probe 70 and/or the mechanical bracket 76 may enable the controller 36 to receive the desired information that is utilized to characterize operation of the valve 12 and/or other component(s), such as to determine whether replacement or maintenance is needed. These mechanical components communicate the mechanical vibration, such as vibration amplitude, frequency and occurrence in correlation to other system conditions.

Health Indicator

A problem with conventional expansion valves is that a systemic "no defect found" (NDF) is occurring in the HVAC industry on returned products. This drives up customer warranty costs and hinders product acceptance.

The present disclosure provides an indicator 78 on the valve 12 that indicates whether the operation of the valve 12 is healthy and/or defective. In the illustrated embodiment, the indicator 78 includes a light, such as an LED, that is operably coupled to the electronics 38 of the power element 24 (e.g., circuit board). This indicator 78 may be operably coupled via the circuit to the controller 36. The indicator 78 may illuminate with one color for a healthy operation of the device, and another different color if the device is operating defectively. Alternatively or additionally, the indicator 78 may utilize an illumination pattern (blinking pattern) for healthy or unhealthy device operation; or the indicator may use other forms of indication such as audible or tactile communication; or communicate such indication to a remote device such as a smart phone.

As discussed above, the controller 36 may use the information received from the probe 70 that corresponds with the mechanical vibration sensed by the probe 70, alternatively or additionally along with system sensor inputs such as pressure, temperature or virtual sensors like superheat and subcooling, to determine if the valve 12 needs to be repaired or replaced. The health indicator 78 may glow one color (e.g., green) for a healthy device (do not change) and another color (e.g., red) for an unhealthy device (repair or change). There may also be an array of different color or blinking schemes that could be added for other alarms. The health indicator 78 may illuminate several minutes after power is removed from the power element, such as via capacitors or onboard battery. The controller 36 may utilize machine learning along with reinforcement of data from system sensors and system run time/on off time. Such an indicator system provides a simple aid that may enable contractors to quickly determine whether the modulating valve 12 needs to be replaced or repaired.

Refrigerant Leak Sensor

There is a need in the art to provide improved refrigerant leak detection in refrigerant systems. For example, some government regulations are driving a need for A2L (mildly-flammable) refrigerant leak detection system on air conditioning systems that operate on A2L refrigerant. One problem, however, is that reliable cost-effective solutions with minimal "cost of change" are not known to be available. It would be desirable if the modulating device in the refrigerant system were capable of automatically closing flow through the system in the event of a refrigerant leak detection, such as A2L for example, however no such devices are known to currently exist in the market.

The present disclosure provides a power element 24 and/or modulating valve 12 having one or more embedded, replaceable or tethered refrigerant leak sensors to address the problems in the art. In the illustrated embodiment, for example, the power element 24 includes such a refrigerant leak sensor 80 embedded in the power element housing 24. As shown, the refrigerant leak sensor 80 includes a portion 82 that is exposed to the external environment for detecting leaks, and another portion 84 that is sealed within the housing 40 for preventing damage to the electronics of the sensor 80 or other electrical components of the power element 24. The refrigerant leak sensor 80 may be configured to sense any suitable refrigerant leak, such as for detecting flammability and/or toxicity levels associated with such refrigerant. In exemplary embodiments, the refrigerant leak sensor 80 is configured to sense non-flammable, mildly-flammable or flammable refrigerants. Such refrigerants may include but are not limited to the above-described refrigerants, including A1, A2L, A3, or B classification refrigerants, for example.

In the illustrated embodiment, the refrigerant leak sensor 80 is operably coupled to the controller 36 (such as via the circuit board of electronics 38), and is configured to detect a leak of refrigerant and communicate information associated with the leak to the electronic controller 36. The electronic controller 36 is configured to receive the information from the refrigerant leak sensor 80, and is configured to control movement of the valve member 22 via the electric actuator 34 based upon the information. For example, if a leak is detected, the power element 24 may trigger the valve member 22 to close, thereby shutting off refrigerant flow. Alternatively or additionally, such closing of the valve 12 may shut down the entire system, such as via a low pressure cut out switch that is used on the refrigerant equipment.

Such a configuration of the power element 24 and/or valve 12 provides a simple and compact package for providing refrigerant leak detection, since no additional wires, sensors or control boards may be necessary for providing such a solution. Additionally, it is advantageous for such a leak sensor to be used in conjunction with the modulating valve to detect a refrigerant leak around the air conditioning evaporator coil and corresponding components due to the plethora of braze joints and resulting potential leak paths in such a confined space. This may be particularly important with flammable or mildly-flammable refrigerants, such as A2L, for example. If the tethered option for the refrigerant leak sensor 80 is used, the design includes a sensor that can be clipped on in customers preferred location in the system, and in communication with the controller 36. Other unique options include either wired and wire-free communication to the home's thermostat to regulate evaporator fan speed (on/off/etc.) and clear out the air to safe levels in response to a refrigerant leak. By communicating to the home thermostat, the device may utilize the "main central control system" of the air conditioning system and can be used to turn system on or off. Additionally, the exemplary refrigerant leak system provided by the current design may provide an alert to the homeowner via mobile device and/or thru the thermostat should there be a refrigerant leak.

Closed-Loop Control Logic

A problem with some conventional modulating valves is that customers are inadvertently reducing the life of the valve by excessively overdriving the valve due to its inherent open loop feedback system. Additionally, each step commanded to be taken may be disrupted or stalled without the control logic's knowing.

Another problem exists with third party controllers used with some modulating valves, which may cause damage to an EEV and/or air conditioning/refrigeration system. There can be mismatches between the manufacturers of the valves and the third party controllers that operate the valve. In some cases, loss of step functions in modulating the valve may occur, which may cause nuisance alarms and system shut down. This can cause damage to the valve and air conditioning/refrigeration system.

The present disclosure provides controller 36 that may utilize a unique closed loop logic feedback system for controlling the valve 12. Such a design, such as when using electric actuator 34 (e.g., electric motor), may allow for the elimination of an expensive rotary or linear encoder. The unique closed loop design may reduce or eliminate the need for overdriving during normal operation, which in return will provide increased valve reliability, reduced warranty costs and opportunity to extend an industry leading warranty on the electronic modulating valve.

Figure 4:
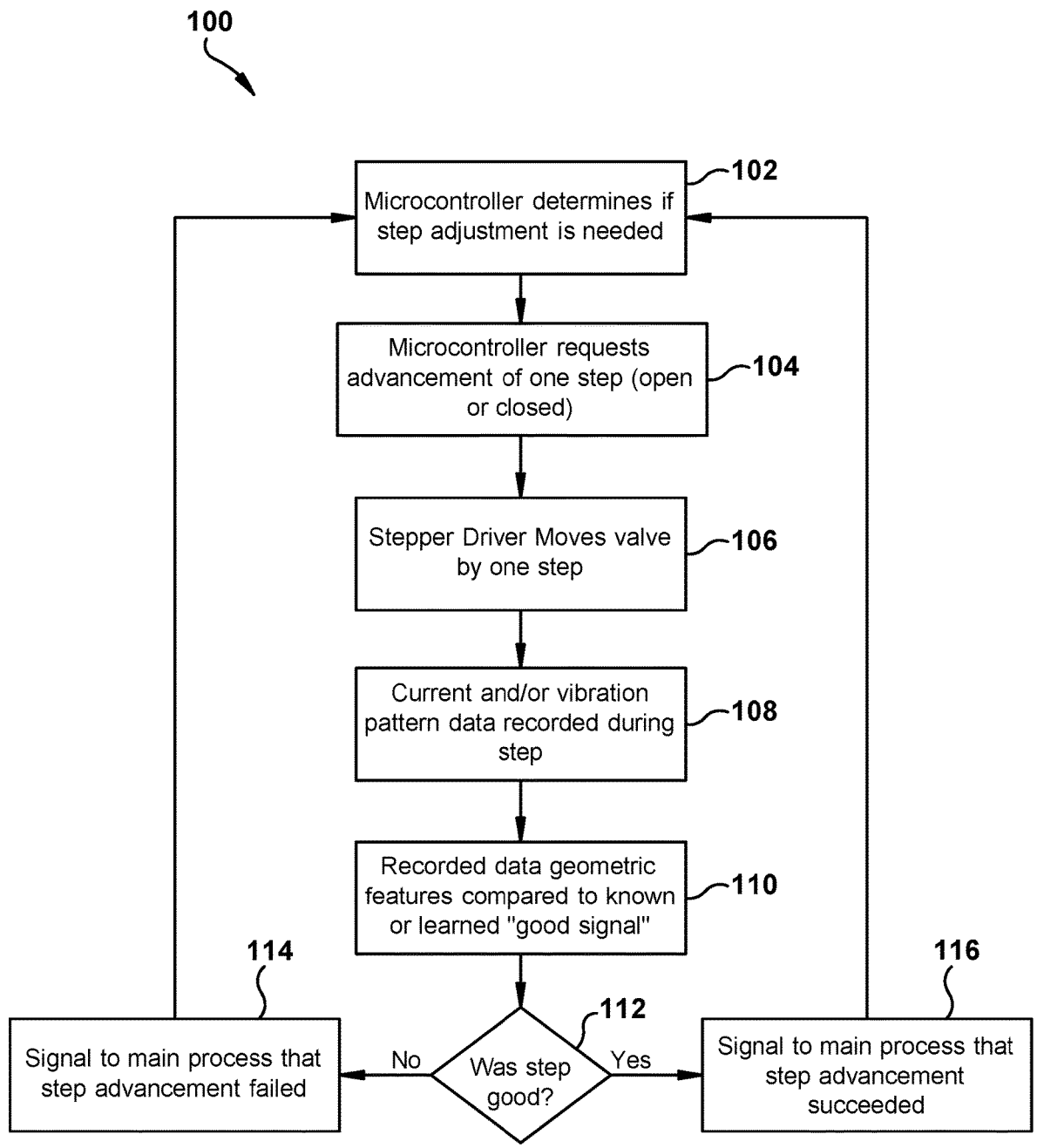
FIG. 4 is a flow chart showing an exemplary closed-loop control logic for operating the valve according to an embodiment of the invention.

Referring to FIG. 4, one example of a closed loop control logic 100 for the electronic controller controlling operation of the valve is shown. For example, as described above, the electronic controller 36 is configured to control movement of the valve member 22 via the electric actuator 34, which may be accomplished with the exemplary closed-loop logic architecture 100. The method of the closed loop control may be utilized for anomaly detection, for example, or for controlling the general operation of the valve 12. The method may begin prior to step 102, by receiving an input that indicates a flow adjustment is required, such by the superheat control. Once within the loop 100, the controller proceeds in a closed-loop manner to assess whether step adjustment of the electric actuator 34 and/or valve member 22 is needed. Such step adjustment may include, for example, partial or full rotation(s) of the rotor 50 and/or valve member 22 to advance the rotor and/or valve member by a predefined linear distance that correlates to a "step."

At method step 102, the controller determines whether step adjustment is needed. At method step 104, the controller will request advancement of one step by the electric actuator 34 to move the valve member 22 further toward a closed position, or further away from the closed position. At method step 106, the electric actuator 34 will move the valve member 22 by one step. At method step 108, the controller 36 may measure an input such as the vibration pattern in the valve (e.g., via probe 70) and/or motor current waveform geometry, or patterns of the geometry, during the step. The measured data may be deciphered into a series of geometric features and recorded, such as in memory, during this step. At method step 110, the measured and/or recorded features from step 108 are compared to known or learned geometries and/or patterns to assess whether the measured/recorded values correspond with a good or bad signal. At method step 112, if the control logic determines that the step was not good, the logic will proceed to step 114, and signal to the main process that step advancement failed. From step 114, the logic will loop back to step 102 to determine if further step adjustment is needed. If at step 112 the control logic determines that the step was good, the logic will proceed to method step 116, and signal to the main process that the step advancement succeeded. From step 116, the logic will loop back to step 102 to determine if further step adjustment is needed.

It is understood that the method described herein may use motor electrical current waveform geometry and/or pattern of geometry during step responses and as a learning reinforcement within the logic, the method may use simultaneous feedback from mechanical communications, such as valve rotor vibration, acoustic changes produced by changes in flow velocity (by the pin moving in and out of the port) and/or phase change of the fluid to increase accuracy of diagnosis of a missed step/valve stall. This unique combination of geometry/pattern recognition and reinforcement using mechanical feedback provides a novel and low cost method for a virtual closed loop modulating valve design. This method improves over conventional open loop designs in the market today.

The electronic modulating valve 12 may utilize the electronic power element 24 interface to solve one or more problems that exist with conventional valves. For example, the exemplary power element 24 may utilize the mechanical (e.g., vibrational) communication interface between the probe 70, mechanical bracket 76 and/or amplifier 74 to provide a valve operation that greatly improves over convention valves. By utilizing the vibrational communication between the valve body 20 and power element 24, the power element 24 may characterize the valve operation relative to the air conditioning system. By characterizing the valve 12, the power element 24 may detect step sequences of the electric actuator 34, and more particularly, step loss due to overdriving, stalling or the like. The vibrational communications and valve characterization can be used to convert an open loop control system to a virtual close loop system to reduce or eliminate excessive valve overdriving. This in return may improve valve life and ensure trouble free air conditioning system operation. In some embodiments, however, the exemplary closed loop control logic may be utilized without the vibrational signature information received from the probe 70. In other words, the exemplary closed loop control logic may be utilized with any information (e.g., temperature, pressure, etc.) received by the controller 36 that may be useful in controlling operation of the valve, and thus modulation of refrigerant fluid flow through the system.

The closed loop control methodology that may be utilized by the controller 36 also is unique in that it may be independent of the refrigerant used in the system. The methodology disclosed herein may be used across systems without additional changes regardless of refrigerant type. By using multi-temperature control, the device may use relative superheat to control the air conditioning system. Conventional methods typically rely solely on pressure and temperature control. In such conventional systems, the pressure sensor and temperature sensor are located on the suction line after the evaporator. The suction pressure is then converted to a saturation temperature using standard thermodynamic properties (saturation tables), that is specific to the refrigerant being used in the system. Likewise, conventional TEVs are usually designed to be used on specific refrigerants and may not always be able to interchange between systems. In contrast, the multi-temperature control provided by the power element 24 and/or valve 12 of the present disclosure may use inputs from one or more parts of the system, such as the electronic valve inlet temperature, outlet temperature and evaporator outlet temperature. An additional temperature sensor may be placed on one or more of the entering circuit tubes to the evaporator for improved control. The electronic valve inlet temperature and outlet temperature sensors may be embedded in the inlet and outlet fittings or placed on the outside of the tubes.

An additional or alternate control methodology of the exemplary controller 36 may include subcooling control whereas a temperature sensor may be placed in the condenser (fins), a temperature sensor placed on the electronic valve inlet, a temperature sensor placed on the electronic valve outlet and a temperature sensor placed on the evaporator outlet. This methodology allows the modulating valve of the present disclosure to alternately control subcooling over superheat when deemed necessary for efficiency reasons; with superheat being a safeguard control to ensure liquid refrigerant does not return to the compressor.

The exemplary power element 24 and/or controller 36 disclosed herein, may use such multi-temperature control without requiring any user interaction before starting the air conditioning system, thus minimizing or eliminating setup time. This is unique over existing electronic expansion valve solutions which require the controller to be set up, which is typically a set of parameters such as valve type, superheat setting, refrigerant type, sensor type to name a few. It is understood, that the controller 36 and/or power element 24 provided by the present disclosure also may use traditional pressure and temperature control.

Other Considerations

Another problem with many conventional EEVs that are intended to replace existing TEVs is that is that additional wiring and/or sensors (such as temperature and/or pressure sensors) may be required for installation of the valve into the refrigeration system, which may increase time, costs and complexity for such designs. Such systems typically include a box of parts (such as temperature sensor(s), pressure transducer, controller and cabling), which complicates the installation procedure and adds cost.

The exemplary power element and/or modulating valve disclosed herein provides a more cost-effective solution to a TEV replacement and should be unmatched in cost/performance by eliminating a separate controller and sensors/cables. As discussed above, the exemplary power element 24 and/or valve 12 may include multi-temperature control vs. pressure-temperature control, which may eliminate pressure transducer cost.

Another common problem in the market is that the cost of change to replace a TEV with an EEV is very high. The shortage of technicians is driving the need for simplicity. The power element 24 and/or valve 12 disclosed herein may minimize complexity during installation and minimize changes to the manufacturing process over conventional EEVs, which require separate controller and sensors. As shown in the illustrated embodiment of FIG. 3, for example, the modulating valve 12 may be constructed with the inlet and outlet fittings similar to those of the TEV intended for replacement, thus making the valve 12 capable of easily being brazed or connected into the system conduits. Optionally, to further enhance the compatibility between the exemplary valve 12 and/or power element 24, the temperature sensor 44 (e.g., equivalent TEV bulb) may be installed, optionally along with a pressure sensor 46 (e.g., equivalent TEV equalizer tube). The only component that may be newly added over the replaced TEV may be a separate power line to power the power element 24.

An exemplary electric power element and/or electronic modulating valve has been described herein. The electronic modulating valve includes a valve body; an electrically actuated valve member mounted in the valve body for modulating flow of fluid through the valve body; and an electric power element having an electric actuator and an electronic controller operably connected to the actuator, in which the actuator is operably connected to the valve member to control movement of the valve member in response to commands from the controller. The valve may include a probe configured to sense a mechanical vibration in the system and/or one or more refrigerant leak sensors. The controller receives information from the probe and/or leak sensor and controls movement of the valve member via the actuator in response to the information. The controller may be configured with a closed-loop logic architecture to control movement of the valve member via the electric actuator.

More generally, the modulating valve described herein includes a unique power element and/or one or more unique sensors and/or a unique control logic for controlling modulation of the valve. It is understood that the power element and/or valve may be utilized with one or more of the foregoing features including: the probe for sensing mechanical vibration in the system, the refrigerant leak sensor, the health indicator, and/or the closed-loop control logic.

The modulating valve may be utilized as an expansion device in a refrigerant system where the high pressure to low pressure (i.e. throttling) occurs, and/or where single point control (pressure, temperature, etc.) is needed.

According to one aspect, the present disclosure provides a power element for a valve that modulates refrigerant. The power element includes a body housing valve motor coils and a controller in communication with a probe, which may be a mechanical probe, that is in communication with a valve for sensing mechanical characteristics of the valve and an indicator on the housing to indicate the health of a valve. The power element can include a leak detection sensor that detects the presence of a refrigerant leak. The probe may detect at least of the following: vibration amplitude, frequency or magnetic field. The power element may further include a bracket for mounting the power element onto a valve.

In an embodiment, the power element also includes a valve resonant chamber, wherein the probe is in contact with the resonant chamber the resonant chamber amplifying at least one of the conditions detected by the probe. The controller can be configured to characterize the valve operation to detect step sequences and step loss due to overdriving and/or stalling.

According to another aspect, the present disclosure includes the power element in combination with a valve that modulates refrigerant, wherein the probe is in contact with the valve.

According to another aspect, the present disclosure relates to a system comprising an assembly of the power element and the valve into an evaporator unit that has an evaporator housing that houses and an evaporator coil, wherein the assembly of the power element and the valve is mounted inside of the evaporator housing, thereby detecting a refrigerant leak therein.

The power element works in companion with an electronically actuated modulating valve. The power element may be removable for serviceability or non-removable for wet harsh environments. Refrigerant flow may be in the side and out the bottom of the valve or reversed. The expansion (high to low drop) of refrigerant occurs on the inside of the valve, regardless of flow direction. The supply voltage provides power to the power element. It may be used to control the air conditioner superheat and/or subcooling.

Generally, the electronic power element may include a controller (e.g., microcontroller based), wired and/or wire-free communication, system sensor inputs, valve sensor inputs, leak detection input and an external signal(s) such as for external relays. Once installed onto the valve and powered on, the power element is in communication with the valve and/or other portions of the refrigerant system via a mechanical connection(s) to capture mechanical communications. Non-limiting examples of mechanical communications include vibrations from the valve to the power element thru sound, direct vibration, magnetics. By capturing the mechanical communications, the power element may characterize the valve relative to the system, and/or may characterize one or more other components of the system.

According to an aspect of the present disclosure, an electronic modulating valve for a refrigerant system includes: a valve body having an inlet passage and an outlet passage; an electrically actuated valve member mounted in the valve body, the valve member being movable within the valve body to modulate flow of fluid between the inlet passage and the outlet passage; an electric power element having at least a portion of an electric actuator; an electronic controller operably connected to the electric actuator, the electric actuator being operably connected to the valve member to control movement of the valve member in response to commands from the electronic controller; and a probe configured to sense a mechanical vibration in the refrigerant system; wherein the electronic controller is operably coupled to the probe and is configured to receive information from the probe that corresponds with the mechanical vibration, the electronic controller being configured to control movement of the valve member via the electric actuator in response to the information received from the probe.

Embodiments according to the present disclosure may include one or more of the following additional features, separately or in any combination.

In some embodiments, the mechanical vibration in the refrigerant system exhibits one or more vibrational signatures, the probe being configured to sense the one or more vibrational signatures and communicate information corresponding with the one or more vibrational signatures to the electronic controller; wherein the electronic controller is configured to process the information received from the probe and control movement of the valve member via the electric actuator in response to the information.

In some embodiments, the one or more vibrational signatures respectively include a vibration signal having a geometric feature set, amplitude, phase and/or frequency that is processed by the electronic controller via one or more signal processing techniques.

In some embodiments, the probe includes an electromechanical transducer that is configured to convert the mechanical vibration sensed by the probe into an electrical signal that is communicated to the electronic controller for processing thereof.

In some embodiments, the electromechanical transducer includes an accelerometer or other piezoelectric device.

In some embodiments, the probe is mounted to a portion of the valve and is in vibrational communication with the refrigerant system via one or more rigid mechanical connections of the valve to one or more fluid conduits of the refrigerant system.

In some embodiments, the mechanical vibration sensed by the probe is transmitted to the probe via a medium provided by the one or more rigid mechanical connections.

In some embodiments, the modulating valve further includes an amplifier operably coupled to the probe, the amplifier being configured to amplify the mechanical vibration in the refrigerant system prior to being received by the probe.

In some embodiments, the amplifier is operably coupled to the valve body, and the probe has a portion that contacts a portion of the amplifier.

In some embodiments, the amplifier includes a resonant chamber.

In some embodiments, the electronic controller is mounted within a housing of the power element.

In some embodiments, the electronic controller is remote from the valve.

In some embodiments, the mechanical vibration in the refrigerant system is generated via operation of the modulating valve and/or operation of one or more other components of the refrigerant system.

In some embodiments, the electric actuator includes an electric motor.

In some embodiments, the electric motor includes a rotor with magnets and a stator with electrical windings.

In some embodiments, the rotor and magnets rotate radially inwardly of the stator and windings.

In some embodiments, the modulating valve further includes a health indicator, the health indicator being configured to alert of a healthy or defective operation of the modulating valve.

In some embodiments, the health indicator includes a light, sound, or communication interface.

In some embodiments, the health indicator is operably coupled to the electronic controller, the health indicator providing the alert in response to the information received by the electronic controller from the probe.

In some embodiments, the modulating valve further includes a refrigerant leak sensor.

According to another aspect of the present disclosure, a refrigerant system, includes: an evaporator, a condenser, a compressor, and the modulating valve according to any of the foregoing; wherein the modulating valve is configured as a refrigerant expansion valve that is located downstream of the condenser and upstream of the evaporator.

According to another aspect of the present disclosure, a power element for a modulating valve of a refrigerant system, includes: at least a portion of an electric actuator configured for operating the modulating valve; an electronic controller operably connected to the electric actuator, the controller being configured to send commands to the electric actuator for controlling operation of the modulating valve; and a probe configured to sense a mechanical vibration in the refrigerant system; wherein the electronic controller is operably coupled to the probe and is configured to receive information from the probe that corresponds with the mechanical vibration, the electronic controller being configured to control operation of the modulating valve via the electric actuator in response to the information received from the probe.

In some embodiments, the electronic controller is mounted within a housing of the power element.

In some embodiments, the electronic controller is remote from the valve.

According to another aspect of the present disclosure, an electronic modulating valve for a refrigerant system, includes: a valve body having an inlet passage and an outlet passage; an electrically actuated valve member mounted in the valve body, the valve member being movable within the valve body to modulate flow of fluid between the inlet passage and the outlet passage; an electric power element having at least a portion of an electric actuator; an electronic controller operably connected to the electric actuator, the electric actuator being operably connected to the valve member to control movement of the valve member in response to commands from the electronic controller; and a refrigerant leak sensor operably coupled to the controller, the refrigerant leak sensor being configured to detect a leak of refrigerant and communicate information associated with the leak to the electronic controller; wherein the electronic controller is configured to receive the information from the refrigerant leak sensor, and is configured to control movement of the valve member via the electric actuator in response to the information.

In some embodiments, the refrigerant leak sensor is mounted to the valve.

In some embodiments, the refrigerant leak sensor is mounted to a housing of the power element, the housing sealing a portion of the refrigerant leak sensor, and another portion of the refrigerant leak sensor being exposed to an environment external to the modulating valve.

According to another aspect of the present disclosure, an electronic modulating valve for a refrigerant system, includes: a valve body having an inlet passage and an outlet passage; an electrically actuated valve member mounted in the valve body, the valve member being movable within the valve body to modulate flow of fluid between the inlet passage and the outlet passage; an electric power element having at least a portion of an electric actuator; an electronic controller operably connected to the electric actuator, the electric actuator being operably connected to the valve member to control movement of the valve member in response to commands from the electronic controller; wherein the electronic controller is configured with a closed-loop logic architecture to control movement of the valve member via the electric actuator.

In some embodiments, the closed-loop architecture is configured to control a position of the electric actuator independently of receiving information from a positional encoder.

In some embodiments, the electric actuator is devoid of an encoder for determining position of the actuator.

In some embodiments, the controller is configured to carry out the following: (i) determining whether step adjustment of the electric actuator is required, the step adjustment of the electric actuator corresponding with a step movement of the valve member of the modulating valve for modulating flow of fluid between the inlet passage and the outlet passage of the valve; (ii) advancing the electric actuator by one step to provide a corresponding step movement of the valve member further toward a closed position, or further away from the closed position; (iii) determining if the step advancement of the electric actuator was within an acceptable range; (iv) if the step in (iii) was not within the acceptable range, signal that the step advancement failed, and thereafter loop back to (i) to determine if further step adjustment is required; and (v) if the step in (iii) was within the acceptable range, signal that the step advancement succeeded, and thereafter loop back to (i) to determine if further step adjustment is required.

According to another aspect of the present disclosure, a method of controlling a modulating valve with a closed-loop logic, includes: (i) determining whether step adjustment of an electric actuator is required, the step adjustment of the electric actuator corresponding with a step movement of a valve member of the modulating valve for modulating flow of fluid between an inlet passage and an outlet passage of the valve; (ii) advancing the electric actuator by one step to provide a corresponding step movement of the valve member further toward a closed position, or further away from the closed position; (iii) determining if a measured quantity derived from the step of the electric actuator was within an acceptable range; (iv) if the step in (iii) was not within the acceptable range, signal that the step advancement failed, and thereafter loop back to (i) to determine if further step adjustment is required; and (v) if the step in (iii) was within the acceptable range, signal that the step advancement succeeded, and thereafter loop back to (i) to determine if further step adjustment is required.

As used herein, an "operable connection," or a connection by which entities are "operably connected," is one in which the entities are connected in such a way that the entities may perform as intended. An operable connection may be a direct connection or an indirect connection in which an intermediate entity or entities cooperate or otherwise are part of the connection or are in between the operably connected entities. Likewise, an "operable communication" as used herein may be a direct or indirect communication. An "operable connection," or a connection by which entities are "operably connected," also may be one in which signals, physical communications, or logical communications may be sent or received. Typically, an operable connection may include a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

As used herein, the term "open-loop" is understood to refer to control in which the result of an adjustment request is unconfirmed. An open-loop system cannot correct for any errors that it makes or correct for outside disturbances. In contrast, "closed-loop" refers to processes wherein the result of a request for adjustment is confirmed using measurements. Closed loop control can detect and correct for errors made by itself or outside influence.

It is understood that embodiments of the subject matter described in this specification can be implemented in combination with digital electronic circuitry, controllers, processors, computer software, firmware, and/or hardware. For example, embodiments may be implemented in a power element and/or modulating valve that uses one or more modules of computer program instructions encoded on a non-transitory computer-readable medium for execution by, or to control the operation of, data processing apparatus.

In the flow diagram(s), blocks may denote "processing blocks" that may be implemented with logic. The processing blocks may represent a method step or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components.

"Logic," as used herein, includes but is not limited to hardware, firmware, software or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

Algorithmic descriptions and representations used herein are the means used by those skilled in the art to convey the substance of their work to others. An algorithm or method is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like. It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities.

Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities. It will be appreciated that the processes may be implemented using various programming approaches like machine language, procedural, object oriented or artificial intelligence techniques. In one example, methodologies are implemented as processor executable instructions or operations provided on a computer-readable medium. Thus, in one example, a computer-readable medium may store processor executable instructions operable to perform a method. The computer-readable medium may be a hard-drive, a machine-readable storage device, a memory device, or a combination of one or more of them.

The controller may include all apparatus, devices, and machines for processing data, including by way of example a programmable processor, a computer, or multiple processors or computers. The controller may include, in addition to hardware, code that creates an execution environment for the computer program in question. The computer program (also referred to as software or code), may be deployed in any form, including as a stand-alone program or as a module, component, subroutine, or other unit suitable for use in a computing environment. The computer program may be deployed to be executed on one computer or on multiple computers that are located at one site or distributed across multiple sites and interconnected by a communication network. The processor may include all apparatus, devices, and machines suitable for the execution of a computer program, which may include, by way of example, both general and special purpose microprocessors, and any one or more processors of any kind of digital computer. Generally, the processor will receive instructions and data from a read-only memory or a random access memory or both. The computer may include, or be operatively coupled to receive data from or transfer data to, or both, one or more mass storage devices for storing data. Devices suitable for storing computer program instructions and data include all forms of non-volatile memory, media and memory devices, including by way of example semiconductor memory devices. The processor and the memory can be supplemented by, or incorporated in, special purpose logic circuitry.

To provide for interaction with a user, embodiments may be implemented using a computer having a display device and an input device. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. Embodiments may include a computing system that includes a back-end component (e.g., as a data server), or that includes a middleware component (e.g., an application server), or that includes a front-end component (e.g., a client computer having a graphical user interface through which a user can interact with an implementation of the subject matter described is this specification), or any combination of one or more such back-end, middleware, or front-end components. The components of the system can be interconnected by any form or medium of digital data communication.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An electronic modulating valve for controlling a flow of refrigerant through a refrigerant system, the modulating valve comprising:
   a valve body having an inlet passage and an outlet passage;
   an electrically actuated valve member mounted in the valve body, the valve member being movable within the valve body to modulate flow of fluid between the inlet passage and the outlet passage;
   an electric power element having at least a portion of an electric actuator;
   an electronic controller operably connected to the electric actuator, the electric actuator being operably connected to the valve member to control movement of the valve member in response to commands from the electronic controller; and
   a probe configured to sense a mechanical vibration in the refrigerant system;
   wherein the electronic controller is operably coupled to the probe and is configured to receive information from the probe that corresponds with the mechanical vibration, the electronic controller being configured to control movement of the valve member via the electric actuator in response to the information received from the probe.

2. The modulating valve according to claim 1, wherein the mechanical vibration in the refrigerant system exhibits one or more vibrational signatures, the probe being configured to sense the one or more vibrational signatures and communicate information corresponding with the one or more vibrational signatures to the electronic controller; wherein the electronic controller is configured to process the information received from the probe and control movement of the valve member via the electric actuator in response to the information;
   more particularly, wherein the one or more vibrational signatures respectively include a vibration signal having a geometric feature set, amplitude, phase and/or frequency that is processed by the electronic controller via one or more signal processing techniques.

3. The modulating valve according to claim 1, wherein the probe includes an electromechanical transducer that is configured to convert the mechanical vibration sensed by the probe into an electrical signal that is communicated to the electronic controller for processing thereof;
   more particularly, wherein the electromechanical transducer includes an accelerometer or other piezoelectric device.

4. The modulating valve according to claim 1, wherein the probe is mounted to a portion of the valve and is in vibrational communication with the refrigerant system via one or more rigid mechanical connections of the valve to one or more fluid conduits of the refrigerant system;
   more particularly, wherein the mechanical vibration sensed by the probe is transmitted to the probe via a medium provided by the one or more rigid mechanical connections.

5. The modulating valve according to claim 1, wherein the mechanical vibration includes sound.

6. The modulating valve according to claim 1, wherein the modulating valve further includes an amplifier operably coupled to the probe, the amplifier being configured to amplify the mechanical vibration in the refrigerant system prior to being received by the probe.

7. The modulating valve according to claim 6, wherein the amplifier is operably coupled to the valve body, and the probe has a portion that contacts a portion of the amplifier;
   more particularly, wherein the amplifier includes a resonant chamber.

8. The modulating valve according to claim 1, wherein the electronic controller is mounted within a housing of the power element, or is remote from the valve.

9. The modulating valve according to claim 1, wherein the mechanical vibration in the refrigerant system is generated via operation of the modulating valve and/or operation of one or more other components of the refrigerant system.

10. The modulating valve according to claim 1, wherein the electric actuator includes an electric motor;
    more particularly, wherein the electric motor includes a rotor with magnets and a stator with electrical windings;
    more particularly, wherein the rotor and magnets rotate radially inwardly of the stator and windings.

11. The modulating valve according to claim 1, further comprising a health indicator, the health indicator being configured to alert of a healthy or defective operation of the modulating valve;
    more particularly, wherein the health indicator includes a light, sound, or communication interface; and/or
    more particularly, wherein the health indicator is operably coupled to the electronic controller, the health indicator providing the alert in response to the information received by the electronic controller from the probe.

12. The modulating valve according to claim 1, further comprising a refrigerant leak sensor.

13. A refrigerant system, comprising:
    an evaporator, a condenser, a compressor, and the modulating valve according to claim 1;
    wherein the modulating valve is configured as a refrigerant expansion valve that is located downstream of the condenser and upstream of the evaporator.

14. A power element for a modulating valve for controlling a flow of refrigerant through a refrigerant system, the power element comprising:
    at least a portion of an electric actuator configured for operating the modulating valve;
    an electronic controller operably connected to the electric actuator, the controller being configured to send commands to the electric actuator for controlling operation of the modulating valve; and
    a probe configured to sense a mechanical vibration in the refrigerant system;
    wherein the electronic controller is operably coupled to the probe and is configured to receive information from the probe that corresponds with the mechanical vibration, the electronic controller being configured to control operation of the modulating valve via the electric actuator in response to the information received from the probe.

15. The modulating valve according to claim 1, further comprising:
    a refrigerant leak sensor operably coupled to the controller, the refrigerant leak sensor being configured to detect a leak of refrigerant and communicate information associated with the leak to the electronic controller;
    wherein the electronic controller is configured to receive the information from the refrigerant leak sensor, and is configured to control movement of the valve member via the electric actuator in response to the information.

16. The modulating valve according to claim 15, wherein the refrigerant leak sensor is mounted to the valve;
more particularly, wherein the refrigerant leak sensor is mounted to a housing of the power element, the housing sealing a portion of the refrigerant leak sensor, and another portion of the refrigerant leak sensor being exposed to an environment external to the modulating valve.

* * * * *